(12) United States Patent
Zanutta et al.

(10) Patent No.: US 9,116,233 B2
(45) Date of Patent: Aug. 25, 2015

(54) POWER MODE CONTROL FOR SENSORS

(75) Inventors: Roberto Ernesto Zanutta, Menlo Park, CA (US); Frank van Diggelen, San Jose, CA (US); Steven Malkos, Los Gatos, CA (US)

(73) Assignee: Broadcom Corporation, Irvine, CA (US)

( * ) Notice: Subject to any disclaimer, the term of this patent is extended or adjusted under 35 U.S.C. 154(b) by 130 days.

(21) Appl. No.: 13/545,717

(22) Filed: Jul. 10, 2012

(65) Prior Publication Data

US 2014/0019044 A1 Jan. 16, 2014

(51) Int. Cl.
G08G 1/123 (2006.01)
G01S 19/34 (2010.01)
G01S 19/49 (2010.01)

(52) U.S. Cl.
CPC *G01S 19/34* (2013.01); *G01S 19/49* (2013.01)

(58) Field of Classification Search
CPC .................................. G01S 19/42; G01S 19/34
USPC .................................................. 701/469, 490
See application file for complete search history.

(56) References Cited

U.S. PATENT DOCUMENTS

| | | | | | |
|---|---|---|---|---|---|
| 5,416,712 | A | * | 5/1995 | Geier et al. | 701/472 |
| 5,657,025 | A | * | 8/1997 | Ebner et al. | 701/300 |
| 6,321,158 | B1 | * | 11/2001 | DeLorme et al. | 701/426 |
| 7,386,389 | B2 | * | 6/2008 | Stolle et al. | 701/106 |
| 7,679,554 | B1 | * | 3/2010 | Hwang et al. | 342/357.24 |
| 8,332,140 | B2 | | 12/2012 | de Silva et al. | |
| 8,694,251 | B2 | * | 4/2014 | Janardhanan et al. | 701/512 |
| 2002/0014990 | A1 | * | 2/2002 | Kimura | 342/458 |
| 2002/0177476 | A1 | * | 11/2002 | Chou | 455/574 |
| 2003/0195008 | A1 | * | 10/2003 | Mohi et al. | 455/456.5 |
| 2004/0002814 | A1 | * | 1/2004 | Gogic | 701/214 |
| 2007/0236387 | A1 | * | 10/2007 | Monnerat | 342/356 |
| 2007/0239813 | A1 | | 10/2007 | Pinder et al. | |

(Continued)

FOREIGN PATENT DOCUMENTS

| | | |
|---|---|---|
| CN | 101858980 A | 10/2010 |
| CN | 102169182 A | 8/2011 |

(Continued)

OTHER PUBLICATIONS

Virginia Driver's Manual, 2014, all pages, http://www.dmv.state.va.us/webdoc/pdf/dmv39.pdf.*

(Continued)

*Primary Examiner* — Calvin Cheung
(74) *Attorney, Agent, or Firm* — Sterne, Kessler, Goldstein & Fox PLLC

(57) ABSTRACT

A method, system, and computer program product to provide accurate positioning of a vehicle while conserving power is provided. The system includes a receiver configured to receive a positioning signal that determines a position of the vehicle and an auxiliary sensor configured to provide data to supplement the positioning signal so as to provide the position of the vehicle more accurately than with using solely the positioning signal. The system also includes an auxiliary controller coupled to the auxiliary sensor. The auxiliary controller is configured to generate a first signal to power-up the auxiliary sensor if the vehicle is proximate to entering an area that reduces accuracy of the positioning signal, and calibrate the auxiliary sensor prior to the vehicle entering the area; and generate a second signal to power-down the auxiliary sensor if the vehicle is proximate to exiting the area.

21 Claims, 8 Drawing Sheets

(56) References Cited

U.S. PATENT DOCUMENTS

| | | | |
|---|---|---|---|
| 2008/0129598 A1* | 6/2008 | Godefroy et al. | 342/450 |
| 2009/0076727 A1 | 3/2009 | Ti | |
| 2009/0098880 A1 | 4/2009 | Lindquist | |
| 2009/0138200 A1* | 5/2009 | Hunter et al. | 701/216 |
| 2010/0039316 A1* | 2/2010 | Gronemeyer et al. | 342/357.06 |
| 2010/0106397 A1* | 4/2010 | Van Essen | 701/200 |
| 2010/0109865 A1* | 5/2010 | Armstrong | 340/539.13 |
| 2010/0125413 A1 | 5/2010 | Wang | |
| 2010/0149030 A1* | 6/2010 | Verma et al. | 342/357.09 |
| 2010/0164789 A1* | 7/2010 | Basnayake | 342/357.04 |
| 2010/0178934 A1* | 7/2010 | Moeglein et al. | 455/456.1 |
| 2010/0211307 A1* | 8/2010 | Geelen | 701/201 |
| 2010/0280751 A1* | 11/2010 | Breed | 701/207 |
| 2011/0071759 A1* | 3/2011 | Pande et al. | 701/213 |
| 2011/0140956 A1* | 6/2011 | Henry et al. | 342/357.3 |
| 2011/0187596 A1* | 8/2011 | Rao et al. | 342/357.66 |
| 2011/0250931 A1* | 10/2011 | Pande et al. | 455/566 |
| 2012/0109517 A1 | 5/2012 | Watanabe | |
| 2012/0112958 A1 | 5/2012 | Alizadeh-Shabdiz | |
| 2012/0116677 A1* | 5/2012 | Higgison et al. | 701/518 |
| 2012/0133555 A1 | 5/2012 | Hyun | |
| 2012/0139775 A1* | 6/2012 | Popovic | 342/173 |
| 2012/0176491 A1* | 7/2012 | Garin et al. | 348/113 |
| 2012/0220308 A1* | 8/2012 | Ledlie | 455/456.1 |
| 2012/0303254 A1* | 11/2012 | Kirsch et al. | 701/123 |
| 2012/0309415 A1* | 12/2012 | Rhoads | 455/456.1 |
| 2013/0002857 A1* | 1/2013 | Kulik | 348/135 |
| 2013/0069821 A1* | 3/2013 | Jambulingam et al. | 342/357.23 |
| 2013/0158857 A1* | 6/2013 | Dutta et al. | 701/409 |
| 2013/0237248 A1 | 9/2013 | Park et al. | |

FOREIGN PATENT DOCUMENTS

| | | |
|---|---|---|
| CN | 201985995 U | 9/2011 |
| CN | 102209153 A | 10/2011 |
| CN | 202305805 U | 7/2012 |
| EP | 2 372 306 A2 | 10/2011 |
| EP | 2 453 262 A2 | 5/2012 |
| KR | 10-2012-0056687 A | 6/2012 |
| KR | 10-2012-0058946 A | 6/2012 |
| TW | 200837330 A | 9/2008 |

OTHER PUBLICATIONS

European Search Report directed to related European Patent Application No. 13 00 3379, Munich, Germany, mailed Nov. 15, 2013, 3 pages.

Office Action directed to related Korean Patent Application No. 10-2013-0081044, mailed Jun. 16, 2014; 4 pages.

Office Action, dated Jan. 20, 2015, for Chinese Patent Application No. 2013102891010, 6 pages.

English language abstract for Taiwanese Patent Publication No. 200837330 A, published Sep. 16, 2008, 1 page.

English language abstract for Chinese Patent Publication No. 102169182 A, published Aug. 31, 2011, 1 page.

English language abstract for Chinese Patent Publication No. 102209153 A, published Oct. 5, 2011, 2 pages.

English language abstract for Chinese Patent Publication No. CN 202305805 U, published Jul. 4, 2012, 1 page.

English language abstract for Chinese Patent Publication No. CN 201985995 U, published Sep. 21, 2011, 1 page.

English language abstract for Chinese Patent Publication No. CN 101858980 A, published Oct. 13, 2010, 1 page.

* cited by examiner

POWER MODE CONTROL FOR SENSORS

FIELD OF THE INVENTION

The embodiments presented herein generally relate to power mode control for sensors in a positioning system.

BACKGROUND

Background Art

Positioning systems, such as satellite-based Global Positioning System (GPS), are commonly used in vehicles for navigation purposes. However, such positioning systems may consume excessive battery power under certain conditions.

What is needed are methods, systems, and computer program products to overcome the above mentioned deficiencies.

BRIEF DESCRIPTION OF THE FIGURES

The accompanying drawings, which are included to provide a further understanding of the disclosure and are incorporated in and constitute a part of this specification, illustrate embodiments of the disclosure and together with the description serve to explain the principles of the disclosed embodiments. In the drawings.

The present disclosure will now be described with reference to the accompanying drawings. In the drawings, like reference numbers may indicate identical or functionally similar elements.

DETAILED DESCRIPTION

Figure 1A:
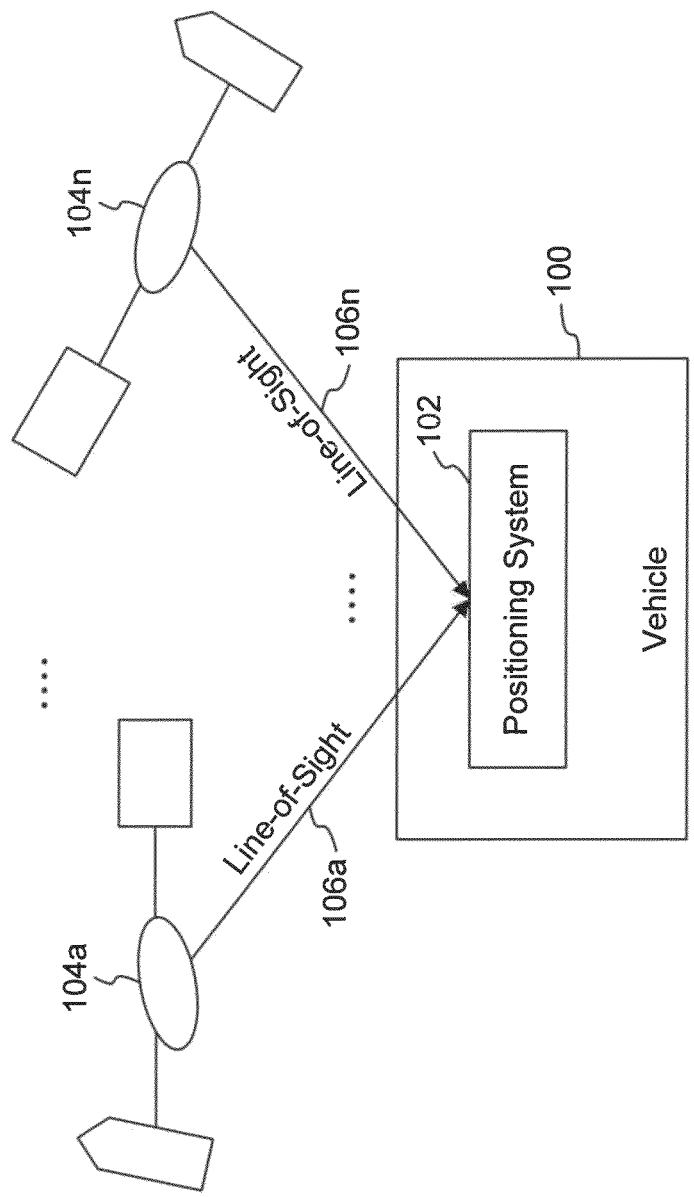
FIG. 1A illustrates an example satellite-based positioning system.

While the present examples described herein with reference to illustrative embodiments for particular applications, it should be understood that the examples are not limited thereto. Those skilled in the art with access to the teachings provided herein will recognize additional modifications, applications, and embodiments within the scope thereof and additional fields in which the embodiments would be of significant utility.

A satellite navigation (SAT NAV) system is a system of satellites that provide autonomous geo-spatial positioning with global coverage. A satellite navigation system with global coverage may be termed a Global Navigation Satellite System (GNSS.) The Global Positioning System (GPS) is a part of GNSS and is an example of a SAT NAV system that provides location and time information anywhere on or near the Earth where there is unobstructed line-of-sight access to four or more GPS satellites. GPS satellites are maintained by the United States government and are freely accessible to anyone with a positioning system that can receive GPS signals from the GPS satellites.

A positioning system calculates its position (and therefore by default a position of the vehicle it is in) based on timing signals sent by GPS satellites. Each GPS satellite continually transmits messages that include the time the message was transmitted and a satellite position at time of message transmission. The positioning system uses the messages it receives to determine the transit time of each message and computes the distance to each satellite. These distances along with the satellites' locations are used with the possible aid of trilateration, to compute the position of the vehicle. This position is then displayed, perhaps with a moving-map display or latitude, longitude and elevation information. Many GPS units show derived information such as direction and speed calculated from position changes.

Three satellites may be enough to solve for position since space has three dimensions and a position near the Earth's surface can be assumed. However, even a very small clock error multiplied by the speed of light (which is the speed at which satellite signals propagate) results in a large positional error in calculated position of a vehicle. Therefore positioning systems may use four or more satellites to solve for both the positioning system's location and time. The accurately computed time is hidden by most GPS applications, which use only the location. A few specialized GPS applications do however use the time; these include time transfer, traffic signal timing, and synchronization of cellular phone base stations.

Although four satellites are required for normal operation, fewer satellites may be used in some cases. For example, if one variable is already known, a receiver can determine its position using only three satellites. For example, a ship or aircraft may have known elevation. Some GPS receivers may use additional assumptions such as reusing the last known altitude, dead reckoning, inertial navigation, or including information from the vehicle computer, to give a less degraded position when fewer than four satellites are visible. In the examples presented herein, the positioning signal is a satellite-based positioning system. However, it is to be appreciated that the positioning signal may be any type of signal that help determine a position of vehicle 100, such as a WiFi or any other signal that can be used for triangulation.

FIG. 1A illustrates an example satellite-based positioning system according to an embodiment of the disclosure. FIG. 1A illustrates satellites 104a-n and a vehicle 100 that includes a positioning system 102, which may be part of a mobile device (e.g. cellular phone), and/or portable GPS device or other positioning system. Positioning system 102 may provide a position and heading of vehicle 100 that helps guide vehicle 100 on, for example, a road. Satellites 104a-n transmit respective positioning signals 106a-n that are used by positioning system 102 to determine a position of vehicle 100. To determine the position of vehicle 100 accurately, positioning system 102 requires line-of-sight access to positioning signals 106a-n. "Line-of-sight" access as referred to herein refers to an unobstructed path for the signals 106a-n from satellites 104 to receiver 108 in vehicle 100. The number of satellites "n" is arbitrary. An example of positioning system 102 is further illustrated in FIG. 1B.

Figure 1B:
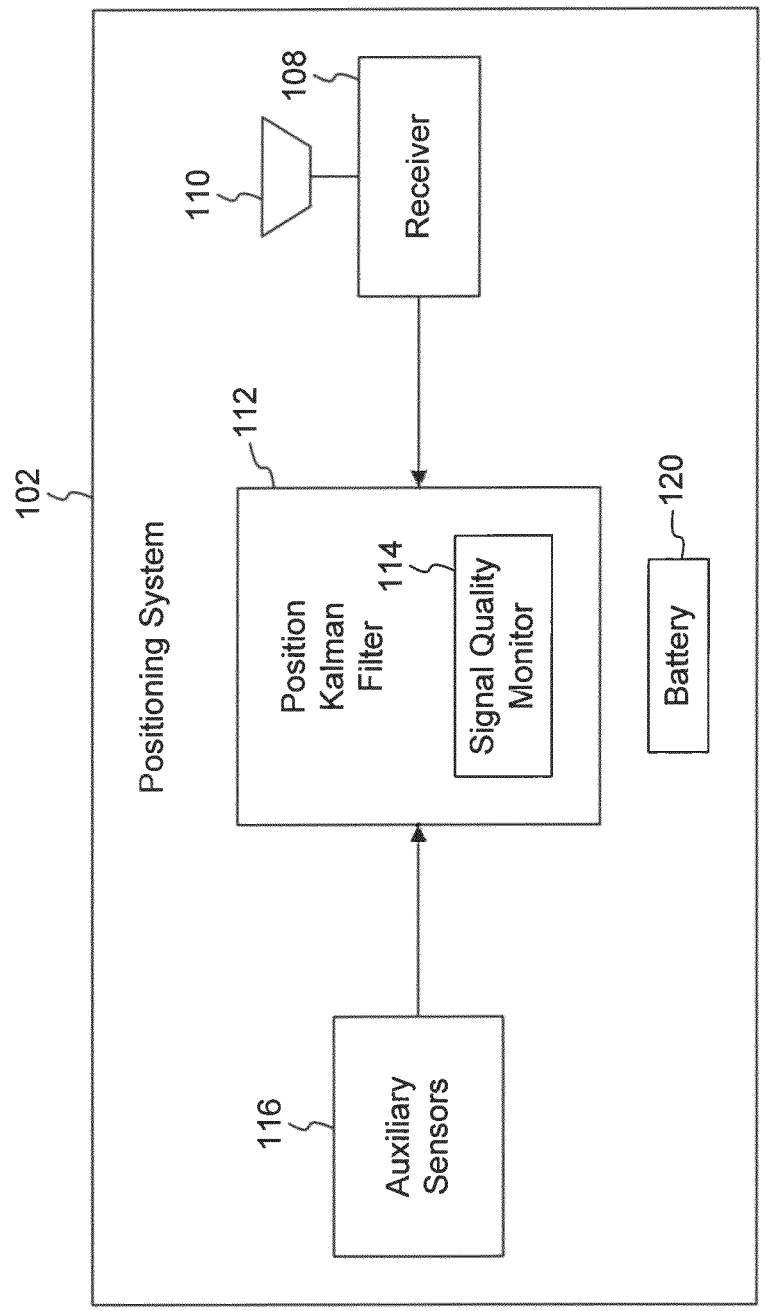
FIG. 1B illustrates an exemplary positioning system.

FIG. 1B illustrates an exemplary positioning system 102. Positioning system 102 includes a receiver 108, antenna 110, position Kalman filter 112, signal quality monitor 114, a battery 120, and auxiliary sensors 116. Receiver 108 is coupled to an antenna 110 and to position Kalman filter 112. Auxiliary sensors 116 are coupled to position Kalman filter 112 as well. Position Kalman filter 112 includes a signal quality monitor 114.

Referring to both FIG. 1A and FIG. 1B, receiver 108 receives signals 106 from satellites 104 via antenna 110. The signals received by receiver 108 are provided to position Kalman filter 112. Position Kalman filter 112 determines a position of vehicle 100 based on the received signals 106. To accurately determine a position of vehicle 100, a heading of vehicle 100 and an orientation of positioning system 102 within vehicle 100, line-of-sight access to positioning signals 106 may be needed. Signal quality monitor 114 determines a strength of positioning signals 106 and whether line-of-sight access to positioning signals 106 is available.

Figure 2A:
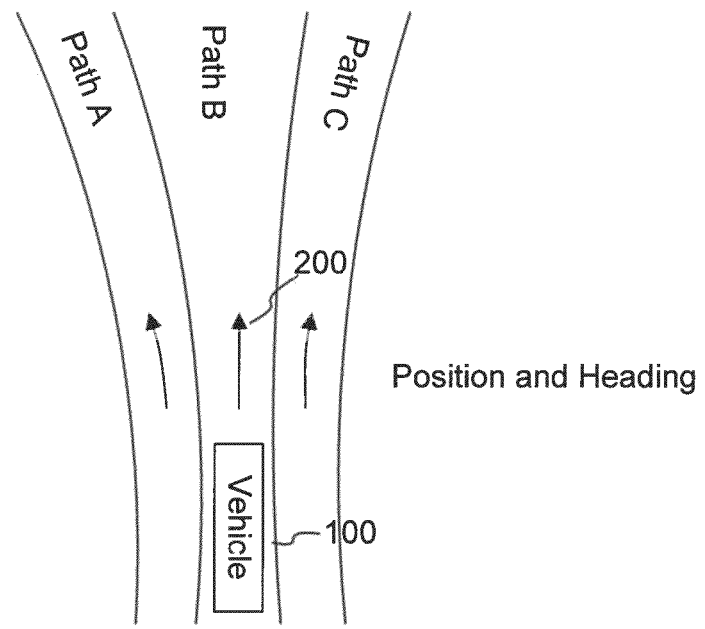
FIG. 2A illustrates an example heading of a vehicle.

A vehicle's "heading" as referred to herein refers to a direction that the vehicle is traveling in. For example, FIG. 2A illustrates an example heading of vehicle 100. In FIG. 2A, vehicle 100 is on a road that diverges into three paths: path A, path B, and path C. To determine which path or heading vehicle 100 is on, position Kalman filter relies on positioning signals 106. In the present example, the heading of vehicle 100 is along path B.

Figure 2B:
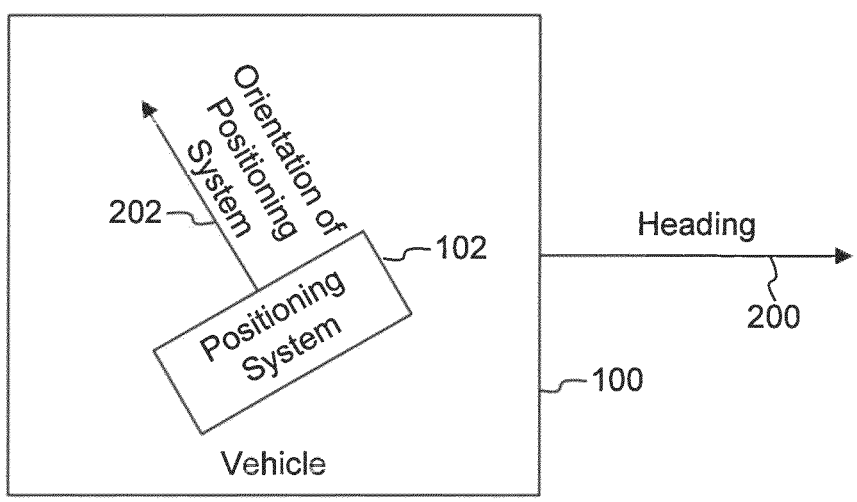
FIG. 2B illustrates an orientation of a positioning system with respect to a heading of a vehicle.

FIG. 2B illustrates an orientation of positioning system 102 with respect to a heading of vehicle 100. As seen in FIG. 2B, an orientation 202 of positioning system 102 may not be the same as a heading 200 of vehicle 100. The "orientation" of positioning system 102 as referred to herein refers to a direction which positioning system 102 is pointing towards. For example, a positioning system, such as a portable GPS navigator or a cellular phone-based GPS system mounted on a dashboard of vehicle 100 maybe oriented in a direction that is different from a heading of vehicle 100. For example, positioning system 102 may be placed in a cup holder or mounted on a windshield at an angle to the heading of the vehicle 100.

In an environment, were there is line-of-sight access to signals 106 from satellites 104, positioning system 102 can accurately determine a position and heading of vehicle 100 along with an orientation of positioning system 102 within vehicle 100. However, in poor signal environments, where line-of-sight access to signals 106 is not available, positioning system 102 may not be able to determine the position and heading of vehicle 100, or the orientation of positioning system 102.

Figure 3A:
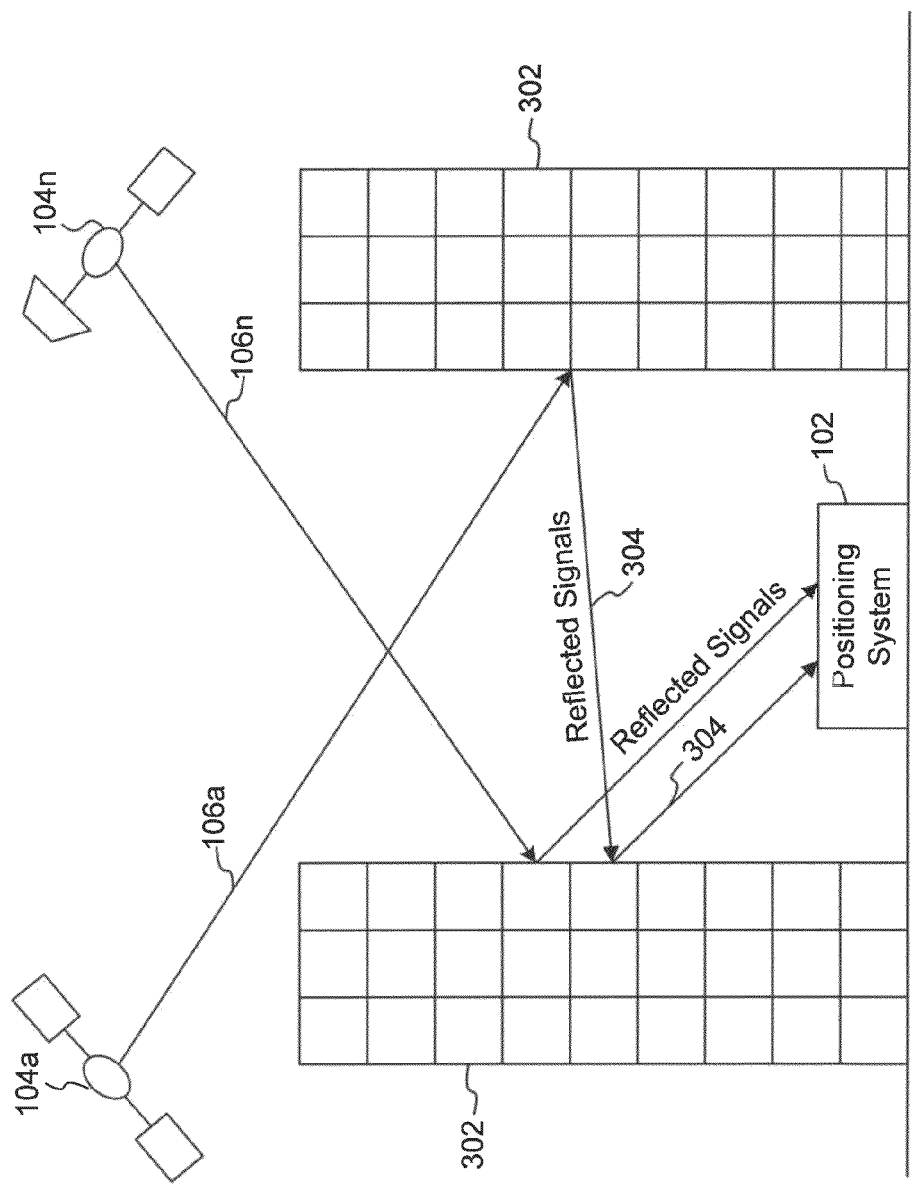
FIG. 3A illustrates an example of a poor signal environment.

FIG. 3A illustrates an example of a poor signal environment 300. A "poor signal environment" as referred to herein refers to any location that prevents unobstructed line-of-sight access to positioning signals 106. A "good signal environment" as referred to herein refers to any location that allows for unobstructed, or substantially unobstructed, line-of-sight access to positioning signals 106.

In FIG. 3A, positioning signals 106 reflect from obstacles 302 to form reflected signals 304. The reflected signals 304 do not provide an accurate position or heading of vehicle 100. This is because while reflected signals 304 provide data that helps determine an approximate position of vehicle 100, reflected signals 304 do not provide as accurate data on a distance of a satellite 104 from positioning system 102 or a speed of satellite 104 with respect to vehicle 100, when compared to line-of-sight signals 106. Therefore, it is not possible to accurately determine a position or heading of vehicle 100, or the orientation of positioning system 102 with respect to the vehicle 100 when compared to using line-of-sight signals 106. An example of a poor signal environment 300 is an "urban canyon." An urban canyon may be, e.g., a city which has tall buildings that form obstacles 302 that prevent line-of-sight access to positioning signals 106. In an urban canyon, positioning system 102 may not be able to determine a position and heading of vehicle 100 at, for example, a four-way intersection because it receives only reflected signals 304. In this example, positioning system 102 may not be able to accurately determine which direction vehicle 100 is headed in, or a direction the vehicle 100 has turned in, because it does not have line-of-sight access to positioning signals 106. In another example, the position of vehicle 100 as determined by positioning system 102 when there is a lack of line-of-sight access to signals 106 may be off by hundreds of feet. In a further example, positioning system 102 may flip a heading of vehicle 100 by 180 degrees in a poor signal environment thereby providing a false heading of vehicle 100. Other examples of poor signal environment 300 may include a forest canopy, a tunnel, a valley or any location that prevents unobstructed line-of-sight access to signals 106.

Figure 3B:
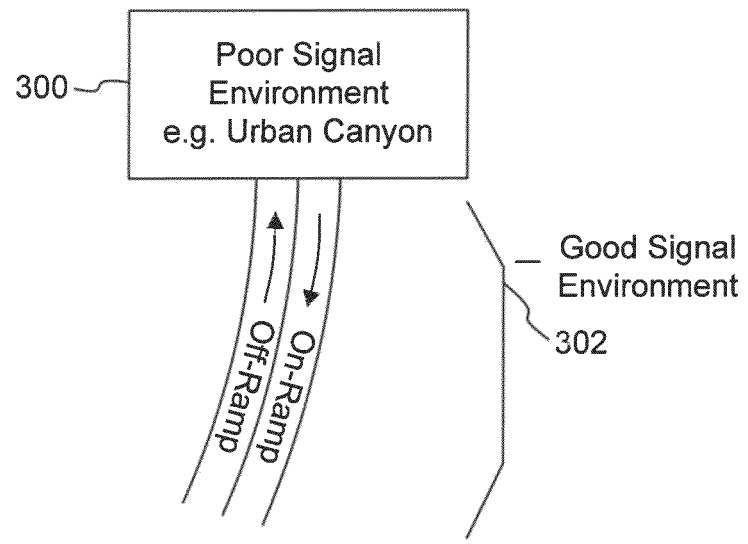
FIGS. 3B-C illustrate examples of good and poor signal environments.

Referring back to FIG. 1B, in the event that line-of-sight access to signals 106 is not available in poor signal environment 300, position Kalman filter 112 requests data from auxiliary sensors 116 to supplement positioning data provided by reflected signals 304 and help determine a more accurate position and heading of vehicle 100. For example, auxiliary sensors 116 may include an accelerometer, a gyro, and a compass. The accelerometer may provide data on a change in speed of vehicle 100 (in for example, meters/second$^2$), along with orientation of positioning system 102 with respect to a heading of vehicle 100. The gyro may provide data on a rate of change in heading of vehicle 100, which is how fast vehicle 100 is turning in degrees/second. The compass may provide a geographic direction vehicle 100 is headed in. In FIG. 3A, data from a gyro can be used by position Kalman filter 112 to determine when the vehicle's path changes direction. Likewise, an accelerometer may be used to determine whether vehicle 100 is in motion and an orientation of positioning system 102 as illustrated in FIG. 3B.

However, auxiliary sensors 116 need to be calibrated before they can provide positioning data. The calibration of auxiliary sensors 116 requires line-of-sight access to positioning signals 106. The auxiliary sensors 116 therefore cannot be calibrated once a vehicle 100 is already in a poor signal environment 300. For example, an accelerometer requires line-of-sight access to positioning signal 106 to initially determine a change in speed of vehicle 100 and orientation of positioning system 102 with respect to a heading of vehicle 100. After calibration, the accelerometer can provide data on whether vehicle 100 is moving and an orientation of positioning system 102 within vehicle 100.

The accelerometer may also depend on a gyro to determine if vehicle 100 has changed its heading in a poor signal environment 300. Similar to the accelerometer, a gyro initially requires line-of-sight access to positioning signals 106 to determine a direction vehicle 100 is headed in. The gyro may provide a change in heading, such as at an intersection. In an example, the reflected signals 304 may falsely indicate that a heading of vehicle 100 has changed when vehicle 100 is at an intersection in a city. However, if the gyro indicates that the heading has not changed, i.e. the vehicle has not turned at the intersection, then the Kalman filter 112 may exclude the positioning data from reflected signals 304 based on the gyro's input.

The positioning signals 106 provide a reference point for a gyro to initialize itself prior to entering environment 300. After the gyro has been calibrated, it can determine a change in heading or rate in change of heading of vehicle 100. Therefore, auxiliary sensors 116 need to be calibrated before vehicle 100 enters a poor signal environment 300 to provide accurate position and heading of vehicle 100 within the poor signal environment.

In an example, auxiliary sensors may be left powered up so that they are calibrated at all times. However, auxiliary sensors 116 require a significant amount of power from battery 120, which may be a limited resource on a mobile device such as a cellular phone or a portable GPS receiver. In another example, auxiliary sensors 116 may be powered up only after signal quality monitor 114 detects that line-of-sight access to positioning signals 106 is not available anymore. In this example, auxiliary sensors 116 will not be able to provide accurate positioning data since they need to be calibrated before they enter the poor signal environment 300.

Figure 3C:
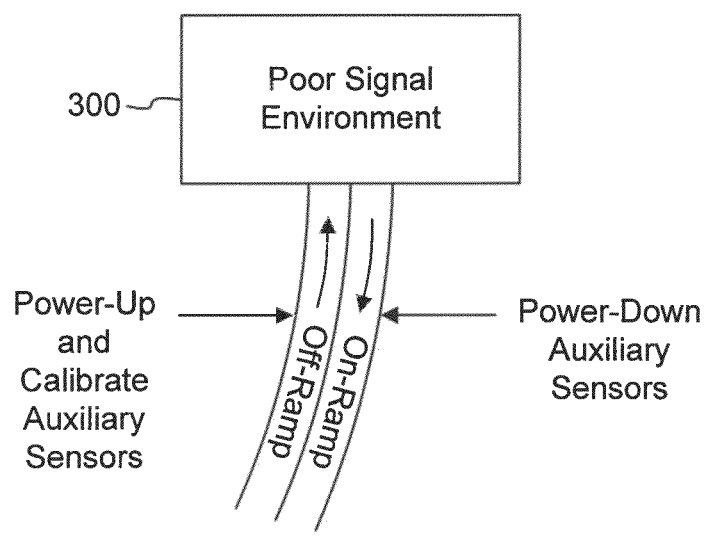
Figure 4:
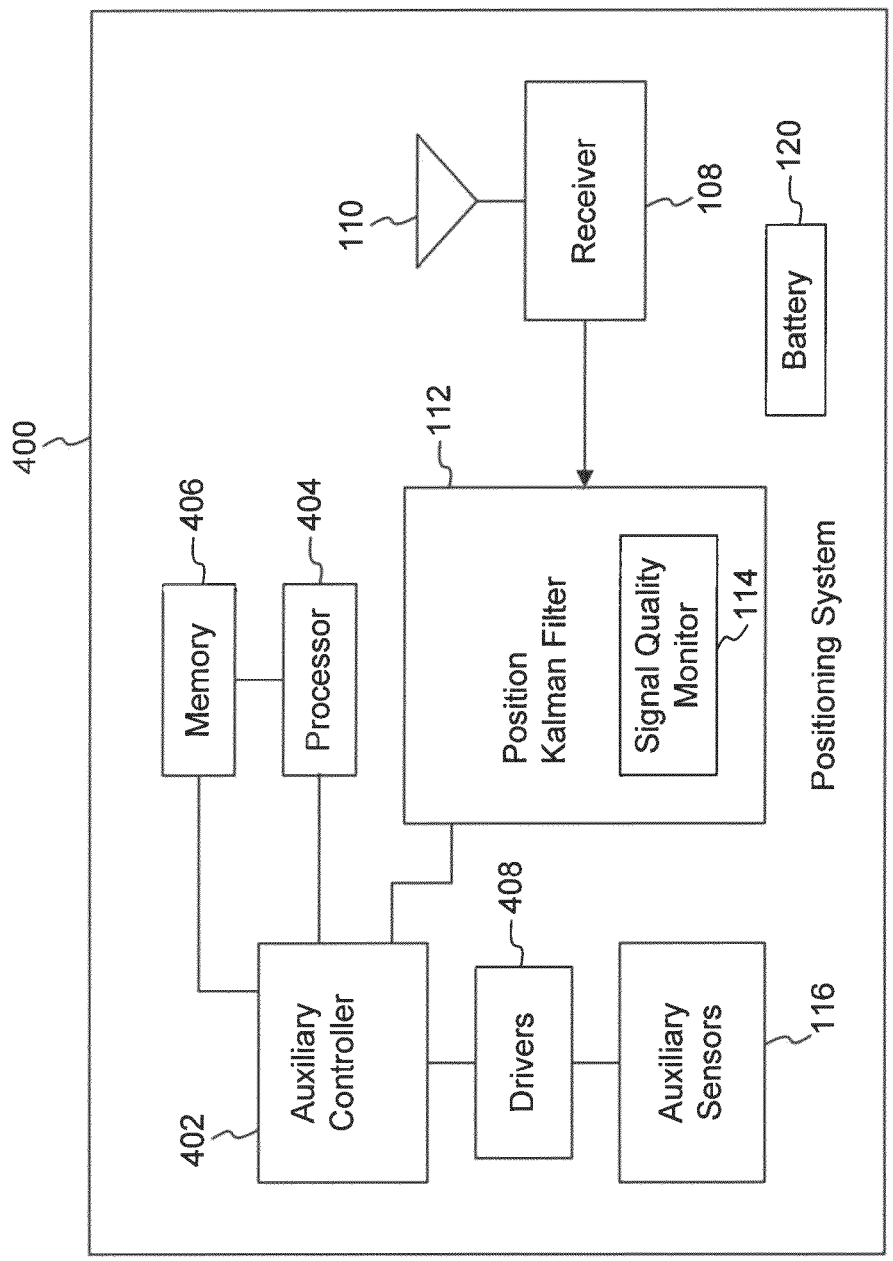
FIG. 4 illustrates an example positioning system that switches power modes for auxiliary sensors according to an embodiment of the disclosure.

Thus, according to an embodiment, to conserver power while providing accurate positioning data, auxiliary sensors 116 are activated and calibrated just prior to entering a poor signal environment 300. Furthermore, auxiliary sensors 116 are deactivated upon exiting poor signal environment 300. FIG. 3B and FIG. 3C show examples of a good and a poor signal environment and when auxiliary sensors are powered up and powered down. FIG. 3B illustrates a poor signal environment 300 and a good signal environment 302. Poor signal environment 300 may be an urban canyon, a forest canopy, a tunnel or any environment that prevents line-of-sight access to positioning signals 106. A good signal environment 302 may be any environment that allows for line-of-sight access to signals 106 such as any kind of open road or highway. For example, on-ramp or an off-ramp may be deemed a good signal environment 302. According to an embodiment, as shown in FIG. 3C, auxiliary sensors 116 are powered up when a vehicle 100 is on an off-ramp (e.g. associated with a highway) and about to enter poor signal environment 300. Similarly, auxiliary sensors 116 are powered down when the vehicle 100 is on an on-ramp and is about to exit poor-signal environment 300. FIG. 4 below describes the means to detect whether a vehicle 100 is entering or exiting a poor signal environment 300 and when to power up or power down auxiliary sensors 116 accordingly.

FIG. 4 illustrates an example positioning system 400 that switches power modes for auxiliary sensors according to an embodiment of the disclosure. Positioning system 400 includes receiver 108 coupled to antenna 110, position Kalman filter 112, signal quality monitor 114, auxiliary controller 402, processor 404, memory 406, drivers 408 and auxiliary sensors 116.

Drivers 408 may be hardware and/or software programs that allow auxiliary controller 402 to control auxiliary sensors 116. Memory 406 may store maps and/or program code. Processor 404 may perform the steps described herein as performed by auxiliary controller 402 based on instructions stored in memory 406.

According to an embodiment, auxiliary controller 402 generates a first signal that causes drivers 408 to activate auxiliary sensors 116 and calibrate them prior to entering a poor signal environment 300. For example, referring to FIG. 3C, auxiliary controller 402 may determine that the speed of vehicle 100 is decreasing below a pre-determined threshold based on data from positioning signals 106. The decrease in speed may be an indication that vehicle 100 is on an off-ramp and is entering a poor signal environment 300, for example, a city. In another example, auxiliary controller 402 may determine that vehicle 100 is entering a poor signal environment 300 based on a current position and heading of vehicle 100 and a map stored in memory 406 that identifies poor signal environments. For example, the auxiliary controller, knowing a current open road position, may detect that the vehicle 100 is approaching an urban environment based on the current position, speed variation, and by consulting a stored map of the area, and therefore determine that the auxiliary sensors 116 should be powered-up via drivers 408, and calibrated for imminent future use.

Auxiliary controller 402 may also generate a signal to power down the auxiliary sensors 116 if the vehicle 100 is proximate to exiting a poor signal environment 300. If a speed of the vehicle increases above a pre-determined threshold, it may indicate that the vehicle 100 is on an on-ramp and about to exit a poor signal environment 300, such as city. Based on the speed of the vehicle 100, the auxiliary control 402 may generate a signal that causes drivers 408 to power down auxiliary sensors 116 and thereby conserve battery 120. In another example, auxiliary controller 402 may determine that a vehicle 100 is exiting a poor signal environment 300 based on a map stored in memory 406. For example, auxiliary sensor 116, based on a current position and heading of a vehicle may determine that the vehicle is on an on-ramp and is exiting a poor signal environment, such as a city. In summary, the auxiliary controller 402 may determine whether the vehicle 100 is entering or exiting a poor signal environment 300 based on one or more of a speed, position, heading of vehicle 100, and the orientation of vehicle 100 with respect to its environment.

Figure 5:
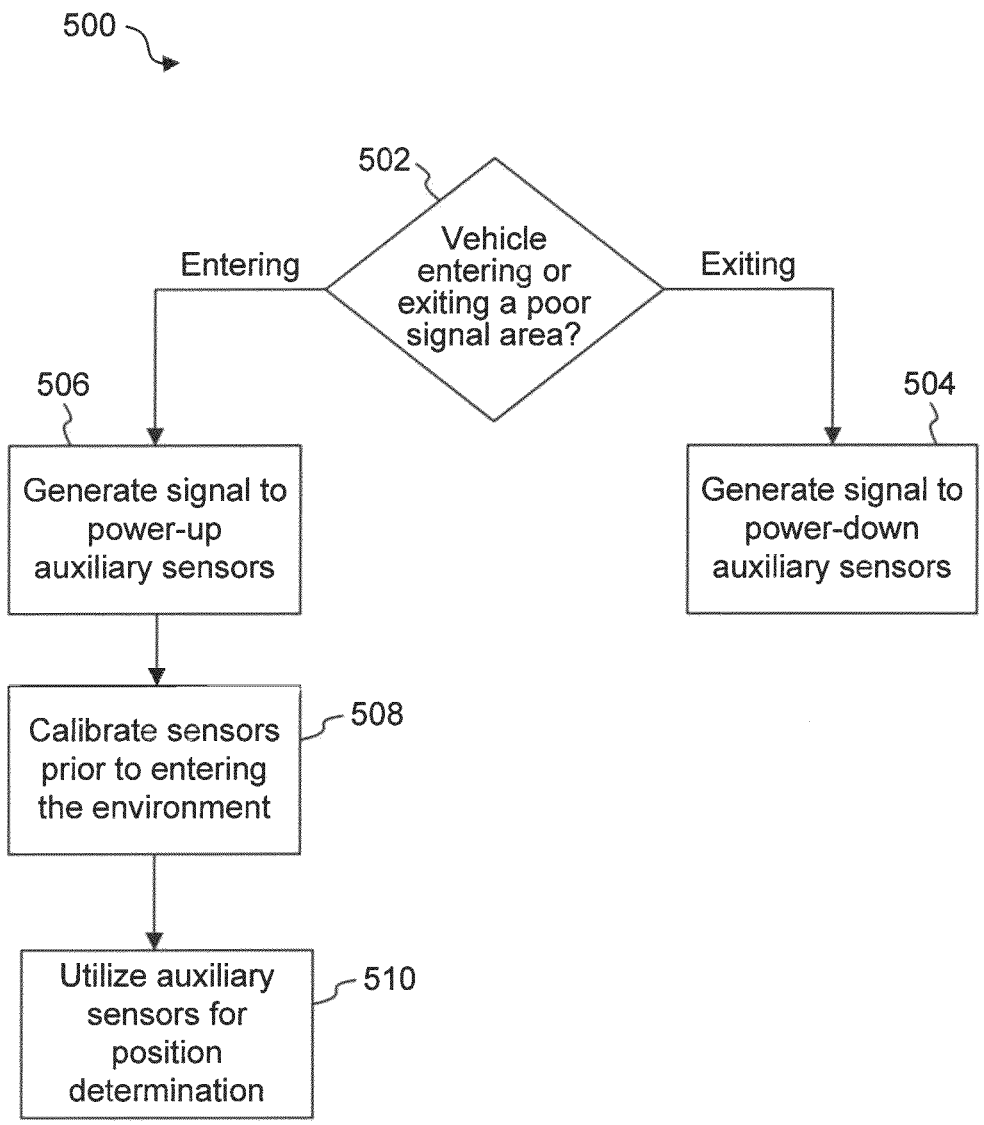
FIG. 5 illustrates an example process illustrating steps performed by a positioning system to provide accurate positioning of a vehicle while conserving power according to an embodiment of the disclosure.

FIG. 5 illustrates an example process 500 illustrating steps performed by a positioning system to provide accurate positioning of a vehicle while conserving power according to an embodiment of the disclosure. Process 500 will be described with continued reference to the example operating environment depicted in FIGS. 1-4. However, the process is not limited to these embodiments. Note that some steps shown in process 500 do not necessarily have to occur in the order shown. In an example, the steps may be performed by auxiliary controller 402. In another example, the steps described herein may be performed by processor 404 based on instructions stored in memory 406.

In step 502, it is determined whether a vehicle is entering or exiting a poor signal environment. For example, auxiliary controller 402 determines whether vehicle 100 is entering a poor signal environment based on one or more of a position of the vehicle, a speed of the vehicle, a speed variation of the vehicle, and a heading of vehicle 100 with respect to its environment. If it is determined, that the vehicle is entering a poor signal environment, then the process proceeds to step 504.

In step 504, a signal is generated to power down an auxiliary device. For example, auxiliary controller 402 generates a signal that causes drivers 408 to power down auxiliary sensors 116.

In step 506, if it is determined that the vehicle is entering a poor signal environment, then auxiliary controller 402 generates signals that cause drivers 408 to power up auxiliary sensors 116.

In step 508, auxiliary sensors are calibrated prior to entering the poor signal environment. For example, the accelerometer and/or gyro are calibrated to provide an accurate heading and position prior to entering a poor signal environment 300.

In step 510, the auxiliary sensors are utilized for position determination based on a starting location, and positional changes detected by the auxiliary sensors. For example, the satellite-based positioning system can provide a starting location while still in a good signal environment, and just before entering the poor signal environment. Afterwhich, the auxiliary sensors can provide assistance data (speed, heading, orientation, etc.) associated with relative positional changes, as described herein, to accurately determine current position, relative to the starting location.

The disclosure has been described in the context of a moving vehicle, and can include any mode of transportation including, but not limited to: automobiles, trucks, trains, planes, boats, bicycles, even foot traffic, etc. In other words, the user device can be moving in an unspecified manner and perform the functions and features of the embodiments described herein.

Example General Purpose Computer System

Embodiments presented herein, or portions thereof, can be implemented in hardware, firmware, software, and/or combinations thereof.

The embodiments presented herein apply to any communication system between two or more devices or within sub-components of one device. The representative functions described herein can be implemented in hardware, software, or some combination thereof. For instance, the representative functions can be implemented using computer processors, computer logic, application specific circuits (ASIC), digital signal processors, etc., as will be understood by those skilled in the arts based on the discussion given herein. Accordingly, any processor that performs the functions described herein is within the scope and spirit of the embodiments presented herein.

Figure 6:
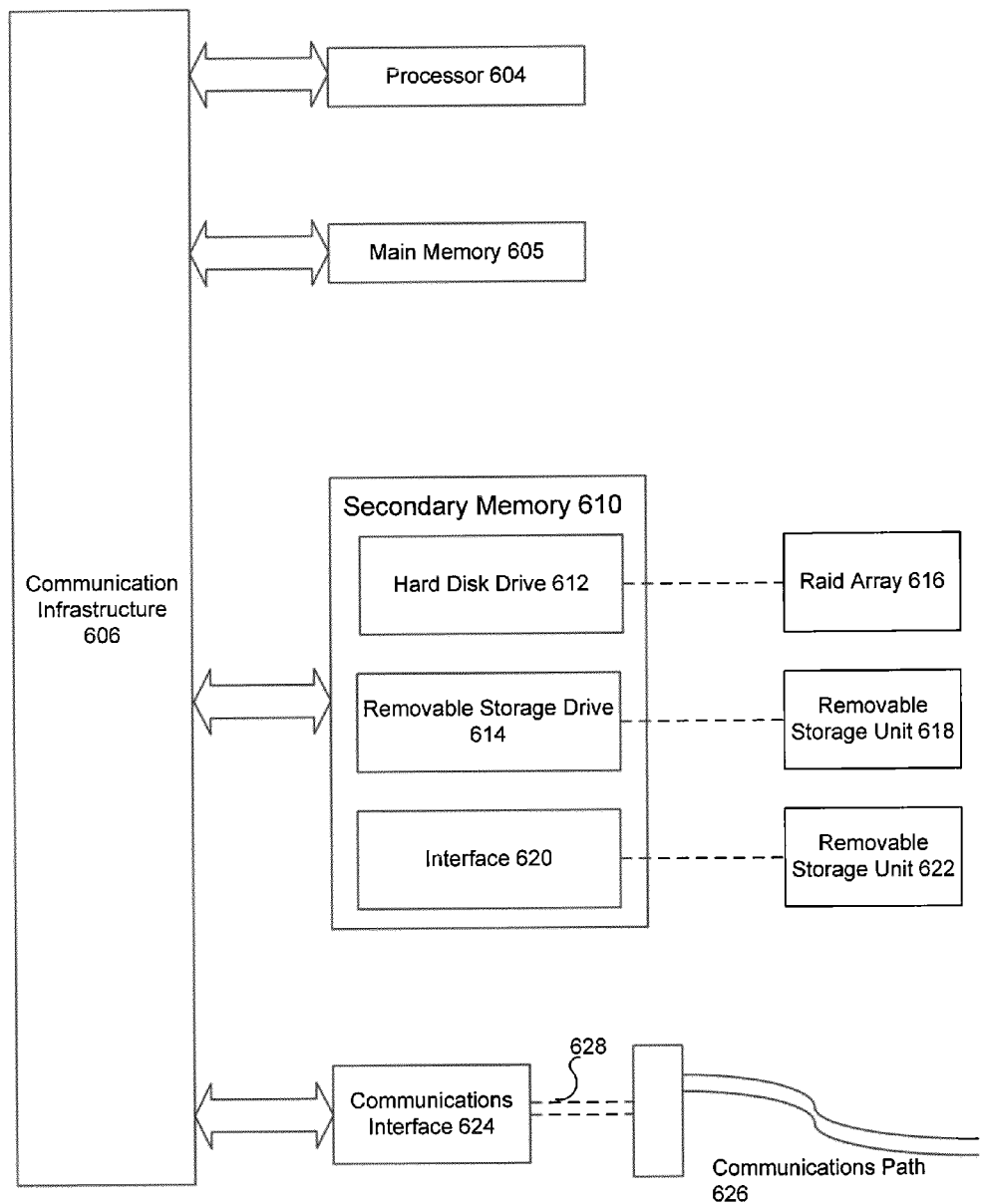
FIG. 6 illustrates is a block diagram of an exemplary computer system on which the embodiments described herein can be implemented.

The following describes a general purpose computer system that can be used to implement embodiments of the disclosure presented herein. The present disclosure can be implemented in hardware, or as a combination of software and hardware. Consequently, the disclosure may be implemented in the environment of a computer system or other processing system. An example of such a computer system 600 is shown in FIG. 6. For example, one or more of the auxiliary controller 402, processor 404, Kalman Filter 112, and their corresponding algorithms described herein can be implemented utilizing all or parts of computer system 600. The computer system 600 includes one or more processors, such as processor 604. Processor 604 can be a special purpose or a general purpose digital signal processor. The processor 604 is connected to a communication infrastructure 606 (for example, a bus or network). Various software implementations are described in terms of this exemplary computer system. After reading this description, it will become apparent to a person skilled in the relevant art how to implement the disclosure using other computer systems and/or computer architectures.

Computer system 600 also includes a main memory 605, preferably random access memory (RAM), and may also include a secondary memory 610. The secondary memory 610 may include, for example, a hard disk drive 612, and/or a RAID array 616, and/or a removable storage drive 614, representing a floppy disk drive, a magnetic tape drive, an optical disk drive, etc. The removable storage drive 614 reads from and/or writes to a removable storage unit 618 in a well-known manner. Removable storage unit 618, represents a floppy disk, magnetic tape, optical disk, etc. As will be appreciated, the removable storage unit 618 includes a computer usable storage medium having stored therein computer software and/or data.

In alternative implementations, secondary memory 610 may include other similar means for allowing computer programs or other instructions to be loaded into computer system 600. Such means may include, for example, a removable storage unit 622 and an interface 620. Examples of such means may include a program cartridge and cartridge interface (such as that found in video game devices), a removable memory chip (such as an EPROM, or PROM) and associated socket, and other removable storage units 622 and interfaces 620 which allow software and data to be transferred from the removable storage unit 622 to computer system 600.

Computer system 600 may also include a communications interface 624. Communications interface 624 allows software and data to be transferred between computer system 600 and external devices. Examples of communications interface 624 may include a modem, a network interface (such as an Ethernet card), a communications port, a PCMCIA slot and card, etc. Software and data transferred via communications interface 624 are in the form of signals 628 which may be electronic, electromagnetic, optical or other signals capable of being received by communications interface 624. These signals 628 are provided to communications interface 624 via a communications path 626. Communications path 626 carries signals 628 and may be implemented using wire or cable, fiber optics, a phone line, a cellular phone link, an RF link and other communications channels.

The terms "computer program medium" and "computer usable medium" are used herein to generally refer to media such as removable storage drive 614, a hard disk installed in hard disk drive 612, and signals 628. These computer program products are means for providing software to computer system 600.

Computer programs (also called computer control logic) are stored in main memory 605 and/or secondary memory 610. Computer programs may also be received via communications interface 624. Such computer programs, when executed, enable the computer system 600 to implement the present disclosure as discussed herein. In particular, the computer programs, when executed, enable the processor 604 to implement the processes of the present disclosure. For example, when executed, the computer programs enable processor 604 to implement part of or all of the steps described above with reference to the flowcharts herein. Where the disclosure is implemented using software, the software may be stored in a computer program product and loaded into computer system 600 using raid array 616, removable storage drive 614, hard drive 612 or communications interface 624.

In other embodiments, features of the disclosure are implemented primarily in hardware using, for example, hardware components such as Application Specific Integrated Circuits (ASICs) and programmable or static gate arrays. Implementation of a hardware state machine so as to perform the functions described herein will also be apparent to persons skilled in the relevant art(s).

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments. Further, the invention should be defined only in accordance with the following claims and their equivalents.

What is claimed is:

1. A system to provide accurate positioning of a device while conserving power, comprising:
a receiver configured to receive a positioning signal that is selectively used to determine a position of the device;
an auxiliary sensor, including a gyro configured to provide a heading of the device, the auxiliary sensor configured to provide data to supplement the positioning signal so that the position of the device is determined more accurately than with using solely the positioning signal;
a filter coupled to the gyro, the filter configured to determine the position of the device and to selectively exclude the positioning signal in determining the position of the device based on the heading provided by the gyro; and
an auxiliary controller coupled to the auxiliary sensor and configured to:
generate a first signal to power-up the auxiliary sensor as the device is proximate to entering an area that reduces accuracy of the positioning signal;
calibrate the auxiliary sensor prior to the device entering the area; and
generate a second signal to power-down the auxiliary sensor as the device is proximate to exiting the area,
wherein the auxiliary controller is configured to determine that the device is proximate to entering the area when a speed of the device is decreased below a threshold speed.

2. The system of claim 1, wherein the auxiliary controller is configured to determine that the device is proximate to exiting the area when the speed of the device is increased above a second threshold speed, and
wherein the auxiliary controller is configured to determine the speed of the device based on the positioning signal.

3. The system of claim 1, wherein the auxiliary sensor increases the accuracy of the positioning signal by providing one or more of the heading of the device, the position of the device, the speed of the device, and an orientation of the system with respect to the heading of the device; and
wherein the heading of the device is a direction the device is traveling in.

4. The system of claim 1, wherein the auxiliary sensor is one or more of an accelerometer, a gyro, and a magnetic compass.

5. The system of claim 1, further comprising:
a memory coupled to the auxiliary controller and configured to store a map;
wherein the auxiliary controller is configured to determine if the device is proximate to entering or exiting the area based on one or more of the map, the position of the device, the speed of the device, and the heading of the device.

6. The system of claim 1, wherein the area is an environment that restricts line-of-sight access of the system to the positioning signal.

7. The system of claim 1, wherein the area is an urban canyon, a forest canopy, or a tunnel.

8. The system of claim 1, wherein the positioning signal is one or more of a satellite-based positioning signal or a triangulation signal.

9. The system of claim 1, wherein the positioning signal is one or more of a Global Navigation Satellite System (GNSS) signal or a WiFi signal.

10. The system of claim 1, wherein the auxiliary sensor is further configured to determine the speed of the device based on the positioning signal.

11. The system of claim 1, wherein the device is in a vehicle.

12. A method in a positioning system, comprising:
determining whether a device is proximate to an area that reduces accuracy of a positioning signal based on whether the device has slowed down below a threshold speed, wherein the positioning signal is selectively used to determine a position of the device;
generating, using a controller, a control signal when the controller has determined that the device is proximate to the area that reduces the accuracy of the positioning signal;
powering up a sensor that provides data to supplement the positioning signal so that the position of the device is determined more accurately than with using solely the positioning signal, in response to the control signal;
receiving a heading of the device from a gyro in the sensor;
selectively excluding the positioning signal in determining the position of the device based on the heading received from the gyro; and
calibrating the sensor prior to the device entering the area.

13. The method of claim 12, wherein the area is an environment that restricts line-of-sight access of the device to the positioning signal.

14. The method of claim 12, wherein it is determined that the device is proximate to the area that reduces the accuracy of the positioning signal based on a map stored in a memory.

15. The method of claim 11, wherein the area is an urban canyon, a forest canopy, or a tunnel.

16. The method of claim 12, further comprising determining whether the device is exiting the area that reduces the accuracy of the positioning signal used to determine the position of the device.

17. The method of claim 16, further comprising powering down the sensor if it is determined that the device is exiting the area that reduces the accuracy of the positioning signal used to determine the position of the device.

18. The method of claim 16, wherein it is determined that the device is exiting the area that reduces the accuracy of the positioning signal used to determine the position of the device when the speed of the device has increased above the threshold speed.

19. The method of claim 11, wherein the positioning signal is one or more of a satellite-based positioning signal or a triangulation signal.

20. The method of claim 12, wherein the positioning signal is one or more of a Global Navigation Satellite System (GNSS) signal or a WiFi signal.

21. A device to provide positioning, comprising:
a receiver configured to receive a positioning signal that is selectively used to determine a position of the device;
an auxiliary sensor, including a gyro configured to provide a heading of the device, the auxiliary sensor configured to provide data to supplement the positioning signal so that the position of the device is determined more accurately than with using solely the positioning signal;
a filter coupled to the gyro, the filter configured to determine the position of the device and to selectively exclude the positioning signal in determining the position of the device based on the heading provided by the gyro; and
an auxiliary controller coupled to the auxiliary sensor and configured to:

generate a first signal to power-up the auxiliary sensor as the device is proximate to entering an area that reduces accuracy of the positioning signal;

calibrate the auxiliary sensor prior to the device entering the area; and generate a second signal to power-down the auxiliary sensor as the device is proximate to exiting the area, wherein the auxiliary controller is configured to determine that the device is proximate to entering the area when a speed of the device is decreased below a threshold speed.

* * * * *